United States Patent
Obata

(10) Patent No.: US 7,839,837 B2
(45) Date of Patent: Nov. 23, 2010

(54) ASYNCHRONOUS SPEECH DATA COMMUNICATION SYSTEM AND COMMUNICATION METHOD THEREFOR

(75) Inventor: Kijuro Obata, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 892 days.

(21) Appl. No.: 11/058,431

(22) Filed: Feb. 15, 2005

(65) Prior Publication Data

US 2005/0203746 A1  Sep. 15, 2005

(30) Foreign Application Priority Data

Feb. 20, 2004  (JP)  ............... 2004-044907

(51) Int. Cl.
*H04J 3/16* (2006.01)
*H04L 12/28* (2006.01)
*H04L 12/56* (2006.01)
*H04L 12/42* (2006.01)
*H04L 12/403* (2006.01)

(52) U.S. Cl. ............. 370/346; 370/395.21; 370/395.41; 370/395.43; 370/455

(58) Field of Classification Search ................. 370/346, 370/395.21, 395.41–395.43
See application file for complete search history.

(56) References Cited

U.S. PATENT DOCUMENTS

| | | | |
|---|---|---|---|
| 4,975,906 A | 12/1990 | Takiyasu et al. | |
| 6,163,532 A * | 12/2000 | Taguchi et al. | 370/338 |
| 6,362,730 B2 * | 3/2002 | Razavi et al. | 340/438 |
| 6,370,163 B1 * | 4/2002 | Shaffer et al. | 370/519 |
| 6,542,495 B1 | 4/2003 | Sugita | |
| 7,046,643 B1 * | 5/2006 | Zellner et al. | 370/329 |
| 7,046,794 B2 * | 5/2006 | Piket et al. | 379/406.04 |

2003/0110286 A1 *  6/2003  Antal et al. ................. 709/236

(Continued)

FOREIGN PATENT DOCUMENTS

EP  0 942 560 A  9/1999

(Continued)

OTHER PUBLICATIONS

Jan Janssen et al., "Delay and Distortion Bounds for Packetized Voice Calls of Traditional PSTN Quality," Proceedings of the 1st IP-Telephony Workshop, GMD Report 95, pp. 105-110 Berlin, Germany, Apr. 12-13, 2000.

(Continued)

*Primary Examiner*—Daniel J Ryman
*Assistant Examiner*—Nishant B Divecha
(74) *Attorney, Agent, or Firm*—Brinks Hofer Gilson & Lione

(57) ABSTRACT

An asynchronous speech data communication system, which is capable of making a hands-free phone conversation at a high speed without causing annoyance in a vehicle, and a communication method therefor are provided. A vehicle-mounted hands-free system includes a speech communication terminal having a speech data communication function, an access point for enabling communication using an asynchronous wireless LAN with other electronic devices, such as a PDA and a mobile audio, including the speech communication terminal, and a communication control section for limiting the packet size of data to be communicated of the other electronic devices when there is communication of speech data by the speech communication terminal.

9 Claims, 10 Drawing Sheets

U.S. PATENT DOCUMENTS

| | | | |
|---|---|---|---|
| 2004/0022203 A1 | 2/2004 | Michelson et al. | |
| 2004/0156350 A1* | 8/2004 | Brasic et al. | 370/346 |
| 2005/0135409 A1* | 6/2005 | Janczak | 370/449 |
| 2005/0222933 A1* | 10/2005 | Wesby | 705/36 |

FOREIGN PATENT DOCUMENTS

| | | |
|---|---|---|
| JP | 10-107818 | 4/1998 |
| JP | 11-266255 | 9/1999 |
| JP | 2001-136190 | 5/2001 |

OTHER PUBLICATIONS

Office Action dated Aug. 5, 2009 issued in related Japanese Patent Application No. 2004-044907 (including English translation).

* cited by examiner

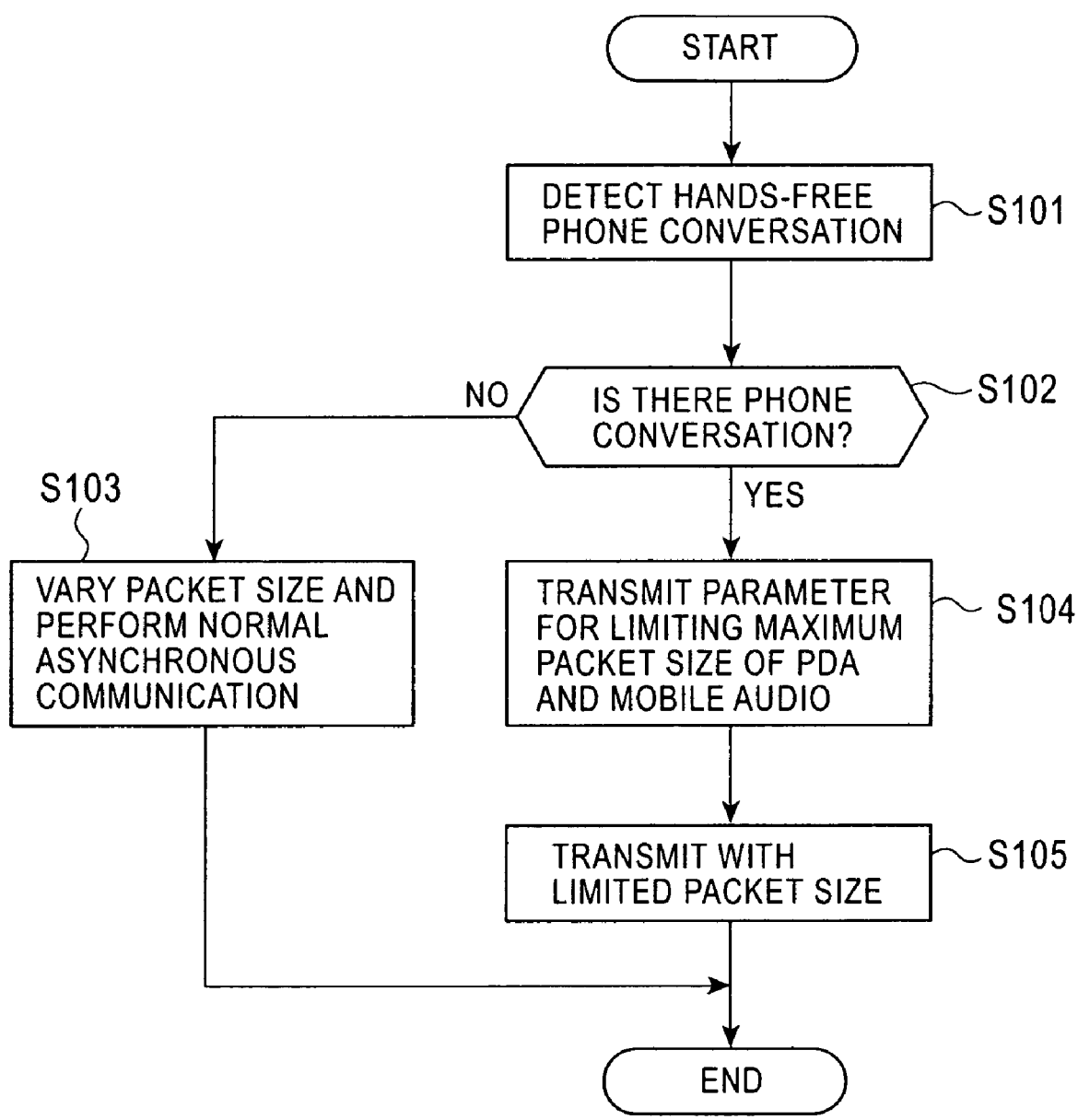

FIG. 4A
FIG. 4B
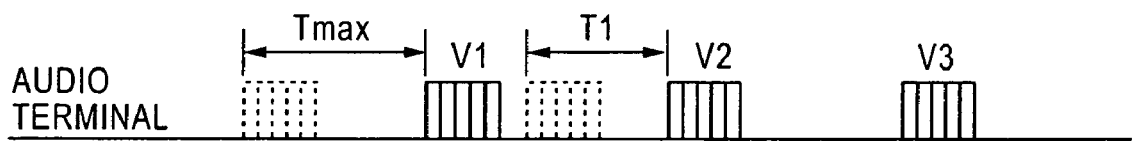
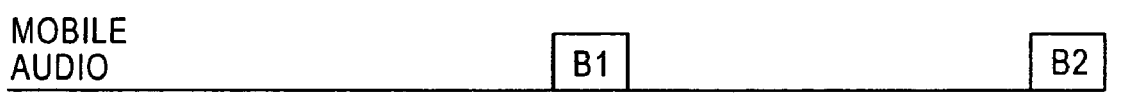

| R-VALUE RANGE | 100-90 | 90-80 | 80-70 | 70-60 | 60-0 |
|---|---|---|---|---|---|
| SPEECH TRANSMISSION QUALITY CATEGORY | BEST | HIGH | MEDIUM | LOW | (VERY) POOR |

| BIT RATE | MAXIMUM MPDU LENGTH (mS) |
|---|---|
| 1 Mbps | 65.536 |
| 2 Mbps | 32.768 |
| 5.5 Mbps | 11.92 |
| 11 Mbps | 5.96 |

US 7,839,837 B2

ASYNCHRONOUS SPEECH DATA COMMUNICATION SYSTEM AND COMMUNICATION METHOD THEREFOR

BACKGROUND OF THE INVENTION

1. Field of the Invention

The present invention relates to an asynchronous speech data communication system and a communication method therefor and, more particularly, relates to a communication system for making a hands-free phone conversation in a vehicle.

2. Description of the Related Art

When speech transmission is performed in a vehicle, a hands-free phone conversation is generally used from the viewpoint of convenience. For example, when a hands-free phone conversation is made using a mobile phone, a user uses a vehicle-mounted audio device and an input/output terminal incorporated in a navigation device or uses a hands-free terminal in which a headphone and a microphone are installed in order to communicate speech data in a wireless manner between the terminal and the main unit of the mobile phone.

In wireless communication, BlueTooth is used as a short distance wireless data communication technology. In BlueTooth, transmission and reception of data such as speech is performed in a wireless manner among mobile phones, notebook computers, PDAs (Personal Digital Assistants), etc. The frequency band used is a 2.45-GHz radio frequency (RF), the operating range is within approximately 10 m, and the data transfer rate is approximately 1 Mbps.

Since the data communication speed of BlueTooth is not very high, as an alternative technology, communication using a wireless LAN (Local Area Network) has begun to be used.

For example, Japanese Unexamined Patent Application Publication No. 2001-136190 discloses a technique in which, in order that an AV device in a vehicle can be used in another vehicle, a wireless LAN unit is connected to a LAN system in the vehicle, and the LAN systems of the vehicles are linked via the wireless LAN unit.

However, the conventional in-vehicle hands-free phone conversation using wireless technology has the following problems. Since BlueTooth has both an asynchronous data channel for data communication and a synchronous channel for speech communication, BlueTooth can be used without problems even for an application that is sensitive to speech delay, such as a hands-free phone conversation. However, when this is to be replaced with a wireless LAN, since the wireless LAN has only an asynchronous data communication system, some kind of mechanism for permitting the maximum delay time in an application that is sensitive to speech delay, such as a hands-free phone conversation, becomes necessary.

When speech data is transmitted by a wireless LAN, the speech data is subjected to pulse code modulation (PCM), the coded speech data is packetized, and this packetized speech data is transmitted to an access point. For the access control system for a wireless LAN, CSMA/CA (Carrier Sense Multiple Access/Collision Avoidance) is used. In this method, when another terminal is communicating with the wireless LAN, the transmission of speech data must be postponed until the communication of the other terminal is completed. That is, the larger the size of one data frame (packet), the larger the maximum waiting time.

FIG. 10 shows the format of a physical layer for use in a wireless LAN (direct diffusion method). FIG. 11 shows the relationship between each bit ratio when the MPDU (data) is the maximum number of bits (65536 bits) and the transmission time at that time.

The frame format has a preamble for achieving synchronization among devices, a header for addresses of a destination and a transmission source and lengths thereof, and a data unit (MPDU) containing data of a variable size. The variable range of data is 4 to 8192 bytes (32 to 65536 bits). When the bit rate of the wireless LAN is set to 1 Mbps to 11 Mbps (54 Mbps has also been used in practice), the delay time, that is, the waiting time, becomes a maximum of approximately 65 ms at the lowest bit rate of 1 Mbps.

Furthermore, since a situation is assumed in which there are two or more terminals waiting for a transmission (the waiting time in this case is 65 ms □ the number of frames), it is not ensured that the speech data can be transmitted in the waiting time of the frame from one terminal. For example, as shown in FIG. 12, when there are two or more terminals that perform data communication with the access point of the in-vehicle wireless LAN, for example, when a PDA, a mobile audio, and a mobile phone exist, speech data V cannot be transmitted from the mobile phone to the access point while the PDA or the mobile audio is transmitting data to the access point. As described above, the waiting time Tmax for transmitting the speech data V is proportional to the data size from the PDA and the mobile audio, that is, the packet size, and during that time, the transmission of the speech data must be postponed. When the delay of the speech data reaches a fixed level or higher, the speech transmission quality deteriorates, and the other party with whom communication is performed may experience some annoyance.

SUMMARY OF THE INVENTION

Accordingly, an object of the present invention is to solve the above-described conventional problems and to provide an asynchronous communication system and a communication method, which are capable of suppressing the delay time of speech data.

Another object of the present invention is to provide an asynchronous speech data communication system and a communication method, which are capable of making a hands-free phone conversation at a high speed without causing annoyance in a vehicle.

To achieve the above-mentioned objects, in one aspect, the present invention provides an asynchronous speech data communication system including: a speech communication terminal having a speech data communication function; and a communication control section that enables asynchronous data communication with another electronic device including the speech communication terminal and that limits the packet size of data to be communicated of the other electronic device when there is communication of speech data by the speech communication terminal.

In another aspect, the present invention provides an asynchronous speech data communication system including: a speech communication terminal having a speech data communication function; and a communication control section that enables asynchronous data communication with other electronic devices including the speech communication terminal and that causes polling of the speech communication terminal to have a higher priority than that of the other electronic devices.

In another aspect, the present invention provides a method for asynchronously communicating speech data between a speech communication terminal having a speech data communication function and other electronic devices, the method including: a first step of detecting the presence or absence of communication of speech data by the speech communication terminal; and a second step of limiting the packet size of data to be communicated of the other electronic devices when it is detected that there is communication of speech data.

In another aspect, the present invention provides a method for asynchronously communicating speech data between a speech communication terminal having a speech data communication function and other electronic devices, the method including: a step of causing polling of the speech communication terminal to have a higher priority than that of the other electronic devices.

According to the asynchronous speech data communication system and the communication method in accordance with the present invention, even when there is data communication with another electronic device, the waiting time or the delay time of communication of speech data by the speech communication terminal can be reduced, and the speech transmission quality can be maintained at a fixed level. If the present invention is applied to a wireless LAN system in a vehicle, a hands-free system that can be used together with electronic devices mounted in the vehicle can be obtained.

The asynchronous speech data communication system and the communication method therefor according to the present invention can be used in a network system that performs asynchronous communication by segmenting data into packets. Preferably, in an in-vehicle hands-free system incorporating a wireless LAN, the present invention can be used together with an AVN (audio visual navigation) device.

BRIEF DESCRIPTION OF THE DRAWINGS

FIG. 3 is a flowchart illustrating a hands-free operation of the first embodiment of the present invention;

FIGS. 4A and 4B show examples of the transmission of data in the hands-free operation according to the first embodiment of the present invention;

DESCRIPTION OF THE PREFERRED EMBODIMENTS

An asynchronous speech data communication system is preferably performed in a hands-free system in which an in-vehicle wireless LAN is used. An example of an in-vehicle hands-free system will now be described below with reference to the drawings.

Figure 1:
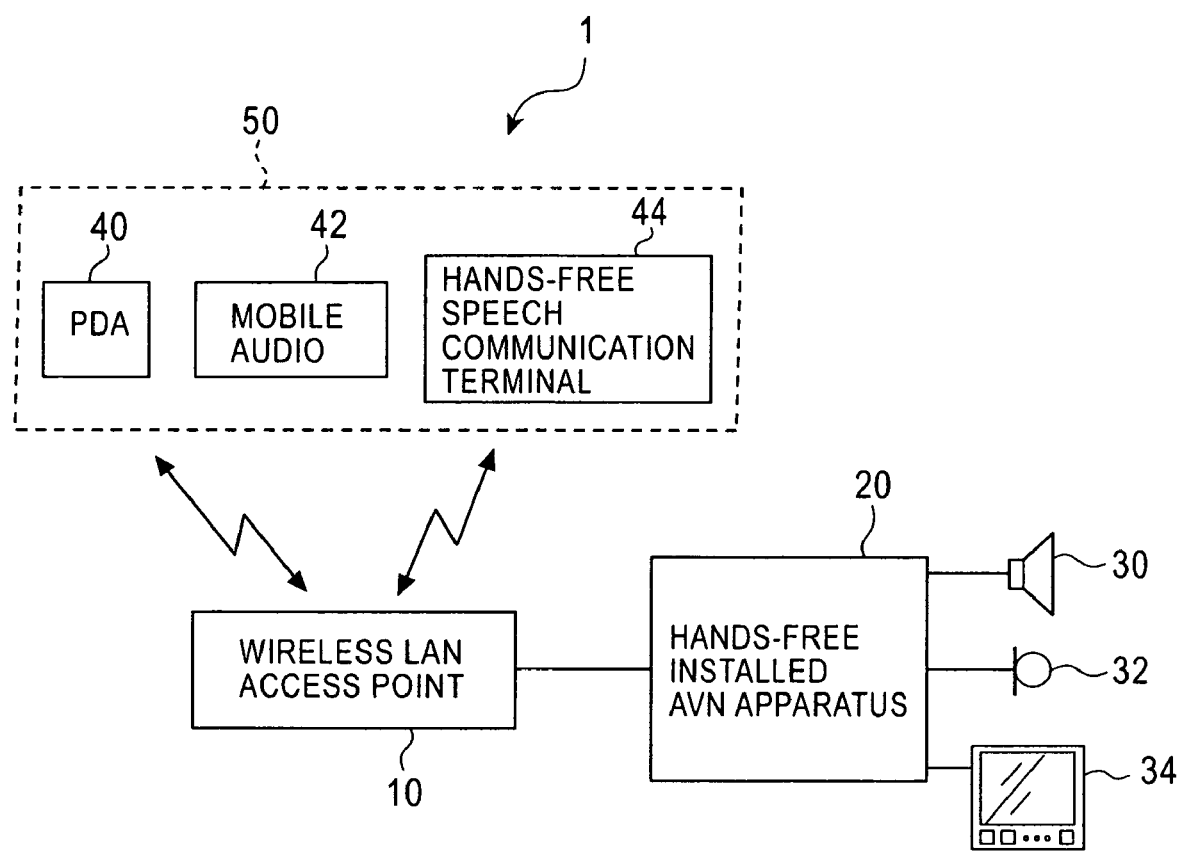
FIG. 1 is a block diagram showing the configuration of a hands-free system according to a first embodiment of the present invention.

FIG. 1 is a block diagram showing the configuration of a hands-free system according to an embodiment of the present invention. An in-vehicle hands-free system 1 according to this embodiment includes an access point 10 of a wireless LAN, an AVN (audio visual navigation) device 20 connected to the access point 10, a speaker 30, a microphone 32, a display unit 34, the speaker 30, the microphone 32, and the display unit 34 being connected to the access point 10, a PDA 40 for performing data communication with the AVN device 20, a mobile audio 42, and a hands-free speech communication terminal 44.

For the hands-free speech communication terminal 44, preferably, a mobile phone is used. However, in addition to the mobile phone, a terminal having a speech data communication function can be used. For example, a hands-free terminal having a microphone for receiving speech from a user, and a speaker and/or a headphone for reproducing speech and having a wireless communication function for performing wireless communication with the access point 10 and other electronic devices may also be used.

When the mobile phone is used as the hands-free speech communication terminal 44, the speech data received by the speech communication terminal 44 from a mobile phone outside a vehicle or an ordinary phone is supplied to the AVN device 20 via the access point 10, and the speech is generated from the speaker 30. Furthermore, the speech received from the microphone 32 is processed as speech data by the AVN device 20, the speech data is transmitted to the hands-free speech communication terminal 44 via the access point 10, and the speech data is further transmitted from the terminal to a mobile phone outside a vehicle and an ordinary phone.

The AVN device 20 is such that a navigation device and an AV device are united. The AVN device 20 plays back music data and video data stored in a storage device, such as a DVD, a CD-ROM, or a hard disk, from the speaker 30 and on the display unit 34, and performs a navigation using a GPS. The AVN device may also be configured in such a manner that an AV device and a navigation device are configured as one unit, and may be a system in which an AV device and a navigation device are connected to each other.

The access point 10, together with a client 50, constitutes a wireless LAN. The client 50 includes the PDA 40, the mobile audio 42, and the hands-free speech communication terminal 44, having a wireless communication function. These are only an example, and other electronic devices may also be used. The access point 10 performs wireless communication in accordance with standardized specifications based on, for example, IEEE 802.11a or IEEE 802.11b.

Figures 10, 11:
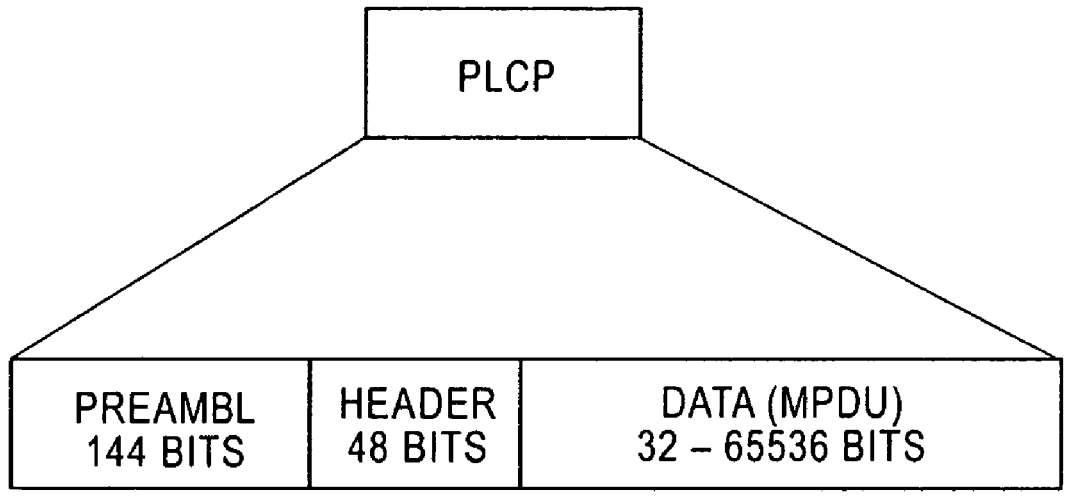
FIG. 10 shows the frame format of a physical layer.
FIG. 11 is a table showing the relationship between a maximum number of bits and a transmission time.
Figure 12:
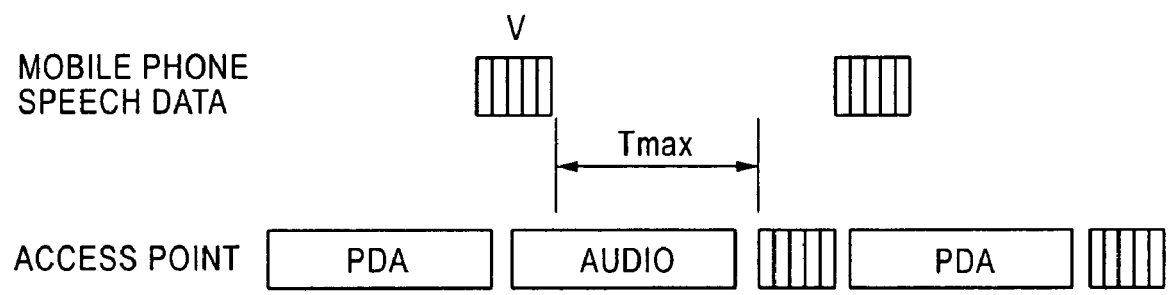
FIG. 12 illustrates problems when speech data is communicated in an asynchronous manner in a conventional case.

For the frame format, for example, the structure shown in FIG. 10 can be used, and for the access control method, CSMA/CA can be used. For the modulation method, CCK (Complementary Code Keying) or OFDM (Orthogonal Frequency Division Multiplexing) is used, and communication is performed using a radio wave of a 2.4 GHz band.

The client 50 packetizes data to be transmitted, and transmits the packetized frames to the access point 10 by confirming that another terminal is not performing a transmission. When the access point 10 receives the frames from the client 50, the access point 10 transmits a response acknowledgement (ACK) to the client 50. The frames received by the access point 10 are supplied to the AVN device 20, whereby necessary processing is performed thereon. On the other hand, the data output from the AVN device 20 to the access point 10 is segmented into frames, and, and the frames are transmitted to the client 50 in a wireless manner.

Figure 2:
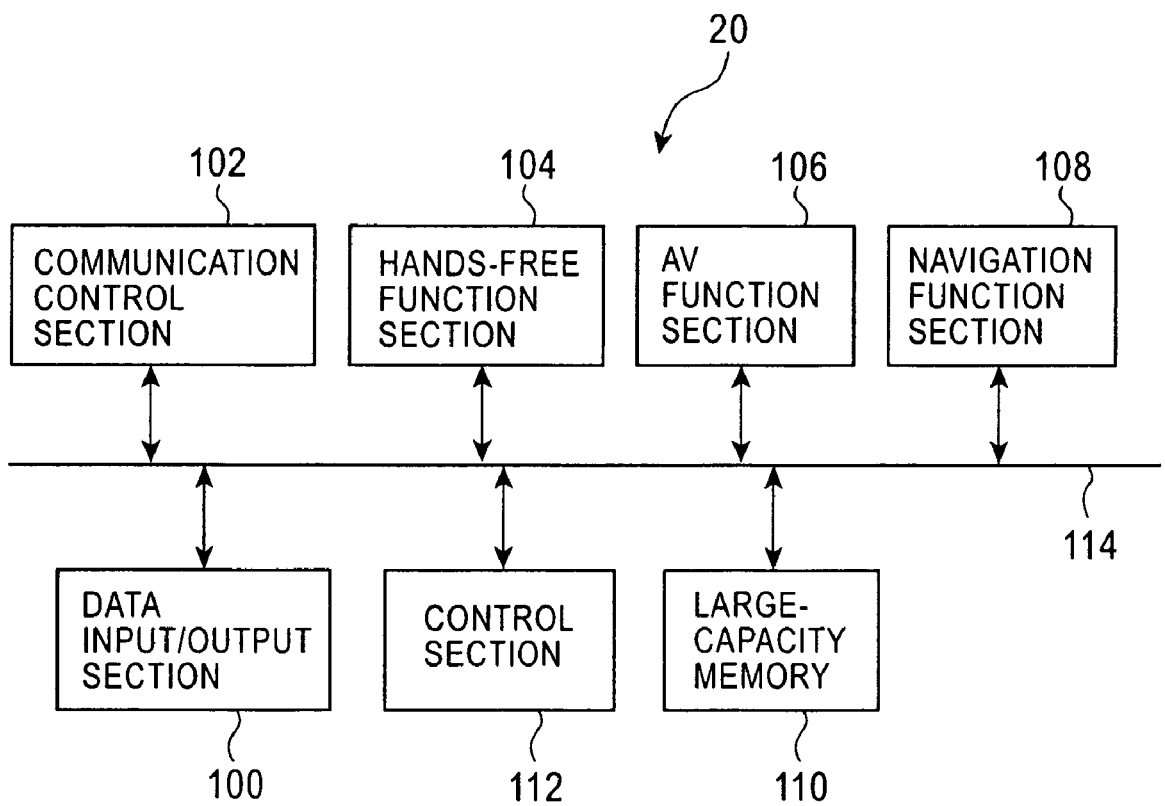
FIG. 2 is a block diagram showing the configuration of an AVN device.

FIG. 2 shows the internal configuration of the AVN device 20. The AVN device 20 includes a data input/output section 100 for performing transmission and reception of data with the access point 10, a communication control section 102 for controlling the operation of the access point 10, a hands-free function section 104 for processing speech data transmitted and received to and from the hands-free speech communication terminal 44, an AV function section 106 for playing back music and video, a navigation function section 108 for performing navigation functions, a large-capacity memory 110 for storing programs, application files, a database, etc., a control section 112 for controlling each section, and a bus 114 for interconnecting the sections.

The hands-free function section 104 causes speech data to be reproduced from the hands-free speech communication terminal 44 from the speaker, and suitably processes (for example, echo canceling) the speech received from the microphone 32. The processed speech data is transmitted to the speech communication terminal 44 via the access point 10.

Next, a description is given of the operation of a vehicle-installed hands-free system according to this embodiment. For the operation of the hands-free system, preferably, the control section 112 controls the operation of each section in accordance with a program stored in the large-capacity memory 110.

FIG. 3 is a flowchart illustrating the operation of the hands-free system. Under the control of the control section 112, the communication control section 102 detects the presence or absence of a hands-free phone conversation (step S101). That is, when data is transmitted via the access point 10, the communication control section 102 detects whether or not the destination address contained in the header of the frame matches the speech communication terminal 44. When they match, it is determined that there is a hands-free phone conversation. On the other hand, when data is received via the access point 10, the communication control section 102 detects whether or not the address of the transmission source, which is contained in the header of the frame, matches the speech communication terminal 44. When they match, it is determined that there is a hands-free phone conversation.

When it is detected that there is no hands-free phone conversation (step S102), asynchronous communication is performed in a normal manner among the access point 10, the PDA 40, and the mobile audio 42 (step S103). For example, as shown in FIG. 4A, after confirming that another terminal is not performing a transmission, the PDA 40 transmits a frame A1 to the access point 10. When the access point 10 receives the frame A1, the access point 10 transmits a response acknowledgement (ACK) to the client 50. Similarly, the mobile audio 42 transmits a frame B1 to the access point 10 after the response acknowledgement (ACK) is received. In this communication, the frame size can be varied in the range of 32 to 65536 bits, and preferably, communication can be performed at a maximum packet size (65536 bits) in order to increase the data communication efficiency.

On the other hand, when it is detected that there is a hands-free phone conversation (step S102), the communication control section 102 permits the maximum delay time of the hands-free phone conversation and performs control described below in order to minimize the delay of the speech data.

As described in the conventional technology, when the packet size (the data frame length) becomes a maximum, the maximum waiting time of the speech communication terminal 44 is approximately 65 ms. To avoid this wait, the packet size at which each terminal can perform communication continuously is limited, and the maximum waiting time of the hands-free phone conversation is shortened. Under the control of the communication control section 102, the access point 10 transmits, to the PDA 40 and the mobile audio 42, a parameter for defining the maximum packet size at which transmission is permitted per packet (step S104).

The PDA 40 and the mobile audio 42 receive the parameter and transmit frames in the form of packets of the packet size defined in this parameter or smaller (step S105).

FIG. 4B shows an example of data communication when there is a hands-free phone conversation. When the speech communication terminal 44 is going to transmit speech data V1 (the timing of the broken line in FIG. 4B), if there is a transmission of the frame A1 by the PDA 40, the speech communication terminal 44 must wait for this transmission to be completed. When the access point 10 transmits, to the client 50, a response acknowledgement (ACK) for confirming the reception of the frame A1 from the PDA 40, the speech communication terminal 44 transmits the speech data V1 to the access point 10. At this time, if the packet size of the frame A1 by the PDA 40 is, for example, 1/10 of the maximum packet size (65536 bits), the maximum delay time Tmax of the speech data V1 can be permitted to be approximately 6.5 ms.

Upon receiving the speech data V1, the access point 10 transmits a response acknowledgement (ACK) to the client 50. If the mobile audio 42 is going to transmit the frame B1, after this acknowledgement is received, the frame B1 is transmitted to the access point 10. While the transmission of the frame B1 is being performed, the speech communication terminal 44 cannot transmit speech data V2. The waiting time T1 of the speech data V2 depends on the packet size of the frame B1. If the packet size of the frame B1 is smaller than that of the frame A1, T1<Tmax holds.

In the manner described above, when there is a hands-free phone conversation, by limiting the packet size of another terminal, the waiting time of the speech data is shortened as much as possible, so that the speech data can be communicated at a high speed while suppressing the deterioration of the speech transmission quality.

Figures 5, 6:
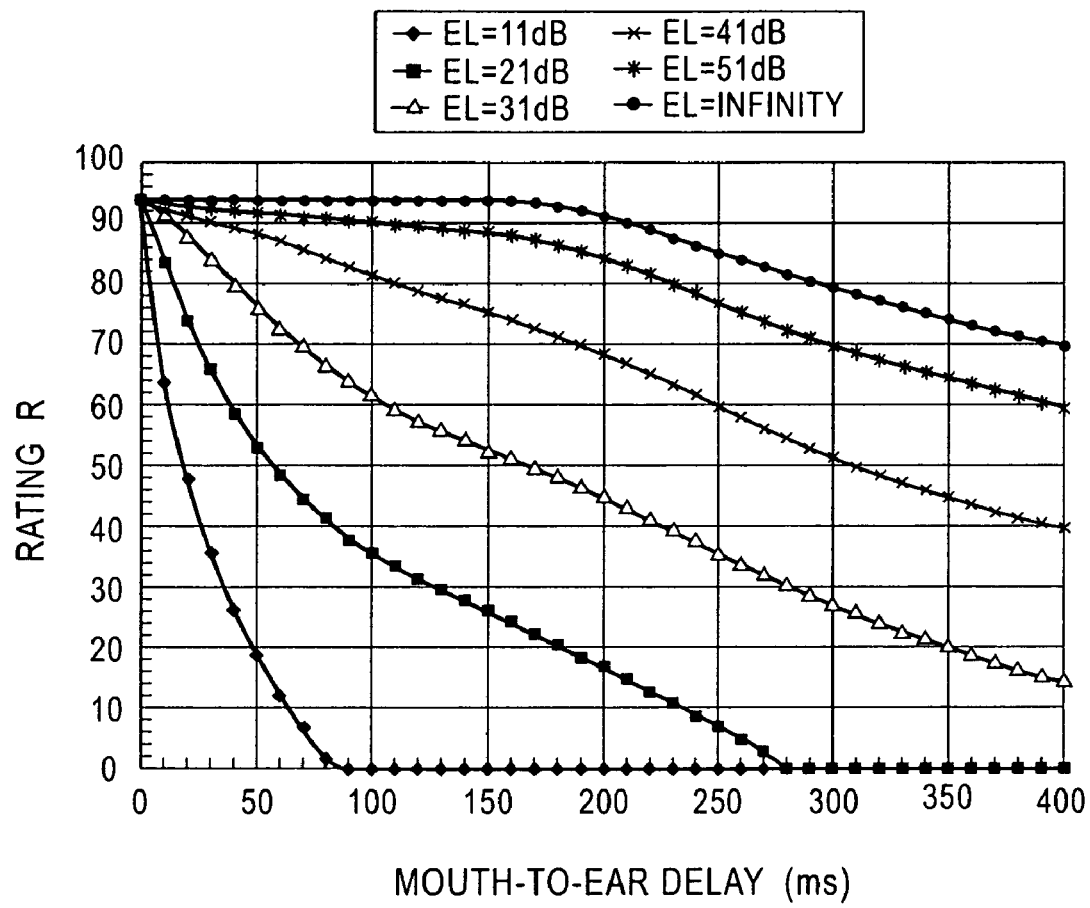
FIG. 5 is a graph showing the relationship between the amount of speech delay and speech transmission quality.
FIG. 6 is a table showing the relationship between speech transmission quality and an R-value range.

Next, a description is given of the delay time of the speech data, which is permitted in a hands-free phone conversation. FIG. 5 is a graph showing the relationship between the amount of speech delay and speech transmission quality. This graph is disclosed in FIG. 2 of the reference document of Jan Janssen et al., "DELAY AND DISTORTION BOUNDS FOR PACKETIZED VOICE CALLS OF TRADITIONAL PSTN QUALITY", Proceedings of the 1 st IP-Telephony Workshop, GMD Report 95, pp. 105-110 Berlin, Germany, 12-13 April 2000. The horizontal axis indicates the delay time (ms) from the mouth to the ear, and the vertical axis indicates a rating R indicating the speech transmission quality. EL denotes an echo loss, which is a loss (dB) for the amount of return when speech is sent from the speaker to the other party.

FIG. 6 shows an R-value range described in Table 1 of the above reference document. It is reported in this reference document that, when the R-value range is lower than or equal to 60, the speech transmission quality is very poor and that the R-value range is preferably at least 70 or higher in the case of a phone conversation using a public network. The echo loss when the mobile phone is used in a hands-free manner in a vehicle is approximately 40 dB. It is understood from this fact that the delay time needs to be lower than or equal to 200 ms (see the curve of FIG. 5 in which the EL is 41 dB).

Figure 7A:
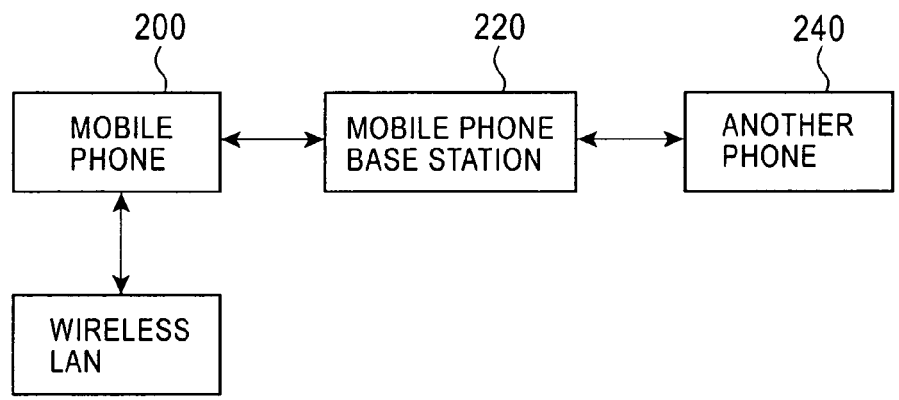
FIGS. 7A and 7B illustrate a delay time on a mobile phone side.

When the mobile phone is used in the hands-free system 1 of FIG. 1, that is, when, as shown in FIG. 7A, a phone conversation is made with another phone 240 from a mobile phone 200 (the hands-free speech communication terminal 44 of FIG. 1) via a mobile phone base station 220, it is necessary to limit the total of the delay time on the wireless LAN side and the delay time on the mobile phone side to within 200 ms.

Figure 7B:
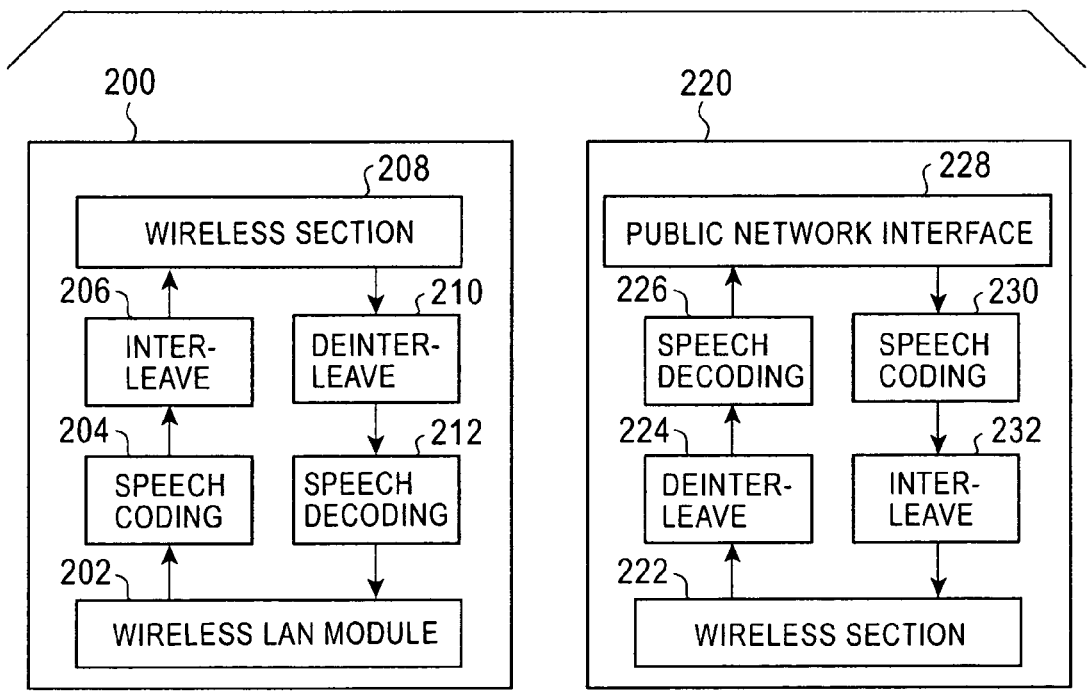

As shown in FIG. 7B, the delay time of the mobile phone 200 is approximately 20 ms required for a speech coding section 204 to process the speech data received by a wireless LAN module 202 and 20 ms required for an interleave section 206 to process the coded speech data, and thus the total time is 40 ms. Similarly, the time required for a deinterleave section 210 to process the speech data received from a wireless section 208 is 20 ms and the time required for a speech decoding section 212 to process the speech data is 20 ms, and thus the total time is 40 ms.

As shown in FIG. 7B, the delay time due to the mobile phone base station 220 is 20 ms required for a deinterleave section 224 to process the speech data from a wireless section 222 and 20 ms required for a speech decoding section 226 to process the speech data, and thus the total time is 40 ms. Similarly, it takes a total of 40 ms for a speech coding section 230 and an interleave section 232 to process the speech data received from a public network interface 228.

The delay time from the mobile phone base station 220 through the public switched telephone network (PSTN) to another phone 240 becomes approximately 20 ms. As a result, the delay time required for a phone conversation from the mobile phone 200 to the other phone 240 becomes a total of approximately 100 ms.

For the delay time on the wireless LAN side, the process performed by the echo canceller for canceling echo of input speech by the hands-free-installed AVN device 20 shown in FIG. 1 takes approximately 30 ms. Therefore, the delay time permitted in the wireless LAN communication is approximately 70 ms (70 ms=200 ms−100 ms−30 ms). The maximum waiting time in the conventional wireless LAN is approximately 65 ms, and this is the waiting time of one data frame or packet. When there is continuous data communication, a delay time of 65 ms×the number of frames occurs. In comparison, in this embodiment, when there is a hands-free phone conversation, by limiting the maximum packet size that can be permitted to approximately 1/10, even if communication of continuous frames is performed, speech data can be communicated within the permitted delay time 70 ms at a very high frequency, and the deterioration of the speech transmission quality can be suppressed.

Figure 8:
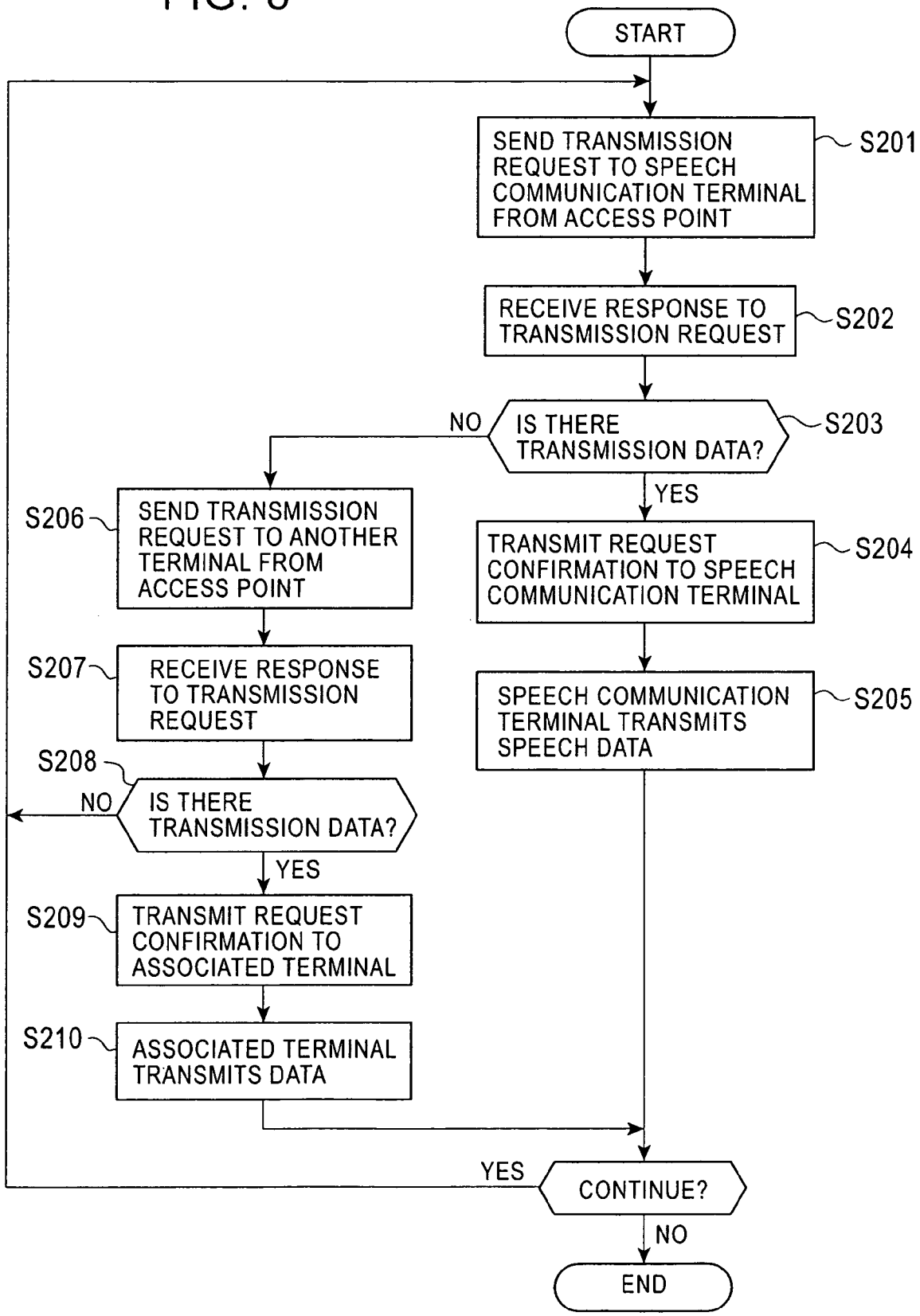
FIG. 8 is a flowchart illustrating a hands-free operation according to a second embodiment of the present invention.

Next, a description is given of the operation of a second embodiment of the present invention. The second embodiment is such that a polling function is combined with the hands-free system incorporating a wireless LAN. FIG. 8 shows a flowchart illustrating the operation thereof.

The access point 10 sends a transmission request as to whether or not there is data to be transmitted, to the hands-free speech communication terminal 44 with a priority higher than those of the PDA 40 and the mobile audio 42 (step S201).

The speech communication terminal 44 transmits a response to the transmission request to the access point 10 (step S202). The communication control section 102 checks the response from the speech communication terminal 44 in order to determine whether or not the speech communication terminal 44 has transmission data (step S203). When the speech communication terminal 44 has speech data to be transmitted, the communication control section 102 transmits a response acknowledgement to the speech communication terminal 44 from the access point 10 (step S204). The speech communication terminal 44 receiving the response acknowledgement transmits the speech data to the access point 10 (step S205). Since the other terminal has not received a response acknowledgement from the access point 10, data cannot be transmitted.

On the other hand, when the speech communication terminal 44 does not have transmission data (step S203), the communication control section 102 sends a transmission request to another terminal (the PDA 40 or the mobile audio 42) (step S206). Then, the communication control section 102 receives a response to the transmission request from the other terminal (step S207) and checks whether or not the other terminal has transmission data (step S208). When the other terminal has transmission data, the access point 10 transmits a response acknowledgement to the other terminal (step S209), and the other terminal transmits data to the access point 10 (step S210). The above steps are performed on each of the PDA 40 and the mobile audio 42, and on which one of them the above steps are performed with a higher priority needs to be determined in advance.

According to the second embodiment, as a result of performing polling of the speech communication terminal 44 with a higher priority than that of the other terminals, the communication of speech data by the speech communication terminal 44 is performed with a higher priority, and the waiting time can be shortened.

Figure 9:
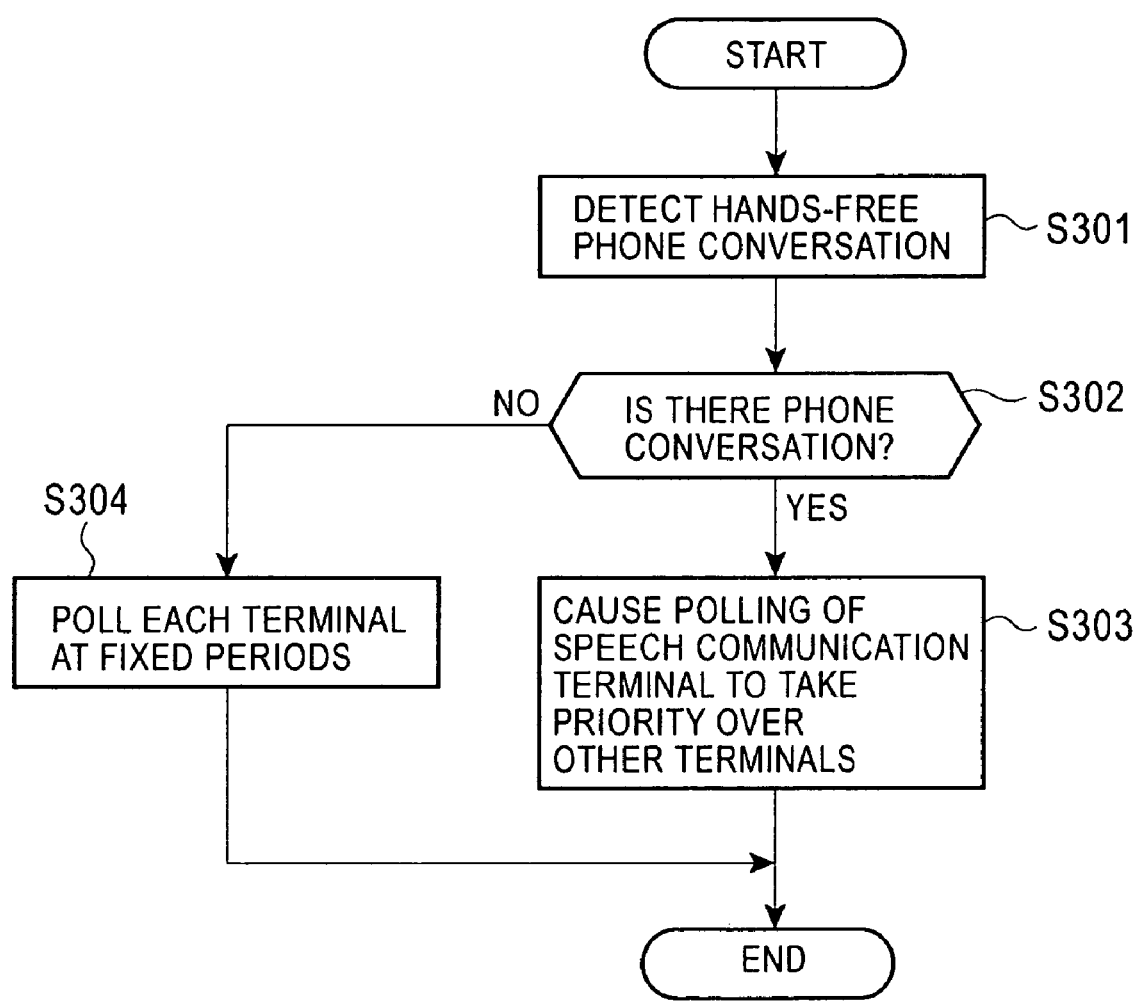
FIG. 9 is a flowchart illustrating a hands-free operation according to a third embodiment of the present invention.

Next, a description will be given, with reference to the flowchart in FIG. 9, of the operation according to a third embodiment of the present invention. The communication control section 102 detects a hands-free phone conversation by the speech communication terminal 44 similarly to the first embodiment (step S301). When it is detected that there is a hands-free phone conversation (step S302), polling of the speech communication terminal 44 takes a higher priority than that of the other terminals (step S303). For example, polling of the speech communication terminal 44 is performed more frequently than polling of the other terminals.

When a hands-free phone conversation is not detected, polling is performed of all the terminals at fixed periods (step S304). Also, in this case, similarly to the second embodiment, polling of the speech communication terminal 44 can be performed with a higher priority.

According to the third embodiment, when there is a hands-free phone conversation, as a result of causing polling of the speech communication terminal 44 to have a higher priority than that of the other terminals, the waiting time of the speech data can be shortened.

The second and third embodiments can be combined with the first embodiment in which the maximum packet size is limited. That is, polling of a speech communication terminal may take a higher priority, and the packet size of data of other terminals may be limited.

In the above-described embodiments, a hands-free system in which a wireless LAN is used is described. However, the present invention is not limited to this example, and may be applied to a hands-free system in which a wired LAN is used. In this case, the speech communication terminal 44 is connected to the AVN device 20 through a LAN cable and a vehicle-mounted bus (CAN-BUS (Controller Area Network-BUS), etc.).

Although, in the above-described embodiments, an in-vehicle hands-free system is described, the present invention is not limited to this system. For example, a hands-free system may be used in a call center in a corporation. Although, in the above-described embodiments, a hands-free function is installed in the AVN device, alternatively, an electronic device, such as a personal computer, may be used. Although an example of communication using a mobile phone is described, alternatively, for example, speech communication using a TV phone and an IP phone is also possible.

What is claimed is:

1. An asynchronous speech data communication system comprising:
   a hands-free speech communication terminal operable to generate speech;
   an audio-visual navigation system configured to communicate with the hands-free speech communication terminal;
   an asynchronous wireless local area network (LAN) operatively coupled between the speech communication terminal and the audio-visual navigation system;
   the wireless LAN including a wireless access point configured to facilitate communication between the speech communication terminal and the audio-visual navigation system;
   the audio-visual navigation system including a communication control processor configured to enable asynchronous data communication between the speech communication terminal and other electronic devices;
   a speech detection processor configured to detect the generation of speech by the speech communication terminal by determining if a header contained in communication frames transmitted or received by the access point indicates a source address or a destination address corresponding to the communication terminal;
   wherein if the speech detection processor does not detect the generation of speech, the communication control processor is configured to direct a polling frequency of the speech communication terminal to be equal to the polling frequency of the other electronic devices and to set a maximum packet size value for packets on the wireless LAN to a first value; and
   wherein if the speech detection processor detects the generation of speech, the communication control processor is configured to direct polling of the speech communication terminal at an increased polling frequency relative to the polling frequency of the other electronic devices to provide a higher priority to the speech communication terminal relative to that of the other electronic devices and is further configured to set the maximum packet size value to a second value where the second value is less than the first value.

2. The asynchronous speech data communication system according to claim 1, wherein the communication control processor comprises the detection processor that detects the generation of speech by the speech communication terminal.

3. The asynchronous speech data communication system according to claim 1, wherein the communication control processor increases the frequency of polling the speech communication terminal to more than the frequency of polling of the other electronic devices.

4. The asynchronous speech data communication system according to claim 1, wherein the speech communication terminal comprises a mobile terminal from which a hands-free phone conversation is possible.

5. The asynchronous speech data communication system according to claim 1, wherein the communication control processor is connected to a vehicle-mounted electronic device.

6. A method for communicating speech data between a hands-free speech communication terminal operable to generate speech, and other electronic devices, the method comprising:
   enabling asynchronous data communication between the speech communication terminal and the other electronic devices;
   providing an audio-visual navigation system;
   operatively coupling an asynchronous wireless local area network (LAN) between the speech communication terminal and the audio-visual navigation system;
   providing a wireless access point within the wireless LAN to facilitate communication between the speech communication terminal and the audio-visual navigation system;
   detecting the generation of speech by the speech communication terminal by determining if a header contained in communication frames transmitted or received by the access point indicates a source address or a destination address corresponding to the communication terminal;
   setting a polling frequency of the speech communication terminal equal to the polling frequency of the other electronic devices, if the generation of speech is not detected and setting a maximum packet size value for packets on the wireless LAN to a first value;
   increasing the polling frequency of the speech communication terminal relative to the polling frequency of the other electronic devices if the generation of speech is detected so as to provide a higher priority to the speech communication terminal relative to that of the other electronic devices, and further setting the maximum packet size value to a second value where the second value is less than the first value.

7. The method for asynchronously communicating speech data according to claim 6, comprising increasing the frequency of polling the speech communication terminal to more than the frequency of polling of the other electronic devices.

8. The method for asynchronously communicating speech data according to claim 6, wherein data communication between the speech communication terminal and the other electronic devices is a communication using an in-vehicle wireless LAN.

9. The method for asynchronously communicating speech data according to claim 8, wherein the speech communication terminal comprises a mobile phone for a hands-free phone conversation.

* * * * *